United States Patent [19]
Brown

[11] 3,723,180
[45] Mar. 27, 1973

[54] CONTACT PROCESS AND APPARATUS

[76] Inventor: Hart Brown, 5300 Brownway Road, Houston, Tex. 77027

[22] Filed: Sept. 1, 1970

[21] Appl. No.: 68,657

Related U.S. Application Data

[62] Division of Ser. No. 701,906, Jan. 31, 1968, Pat. No. 3,549,526.

[52] U.S. Cl. .................134/25, 23/283, 23/285, 23/288 E, 23/288 S, 75/101 BE, 423/6
[51] Int. Cl. ............B01j 1/00, B01j 9/20, C22b 3/00
[58] Field of Search ...23/288 S, 288 E, 288 US, 283, 23/285; 210/33, 189; 134/25, 182

[56] References Cited

UNITED STATES PATENTS

| | | | |
|---|---|---|---|
| 2,742,381 | 4/1956 | Weiss et al. | 134/25 |
| 3,092,515 | 6/1963 | Pike et al. | 134/25 |
| 2,740,752 | 4/1956 | Anhorn | 23/288 S X |
| 2,856,264 | 10/1958 | Dunn, Jr. | 23/288 S X |
| 3,003,640 | 10/1961 | Pearce | 134/25 X |
| 2,494,337 | 1/1950 | Hemminger | 23/288 S |
| 3,079,222 | 2/1963 | Reeve | 23/288 S X |
| 2,513,369 | 7/1950 | Shaw | 23/288 S UX |
| 2,779,777 | 1/1957 | Mungen | 23/288 S X |
| 2,740,698 | 4/1956 | Helwig | 23/288 S |

*Primary Examiner*—Joseph Scovronek
*Attorney*—J. Vincent Martin, Joe E. Edwards and Jack R. Springgate

[57] ABSTRACT

A method and apparatus for providing intimate countercurrent contact between a fluid and solid particles in which the fluid is directed through a plurality of trays in one direction to fluidize the solid particles and intermittently the flow is reversed to transport the solid particles through passages in the trays to the next subsequent stage. The apparatus includes a plurality of vertically stacked substantially imperforate trays and tubular members defining passages through the trays and extending substantially above and below the trays.

16 Claims, 38 Drawing Figures

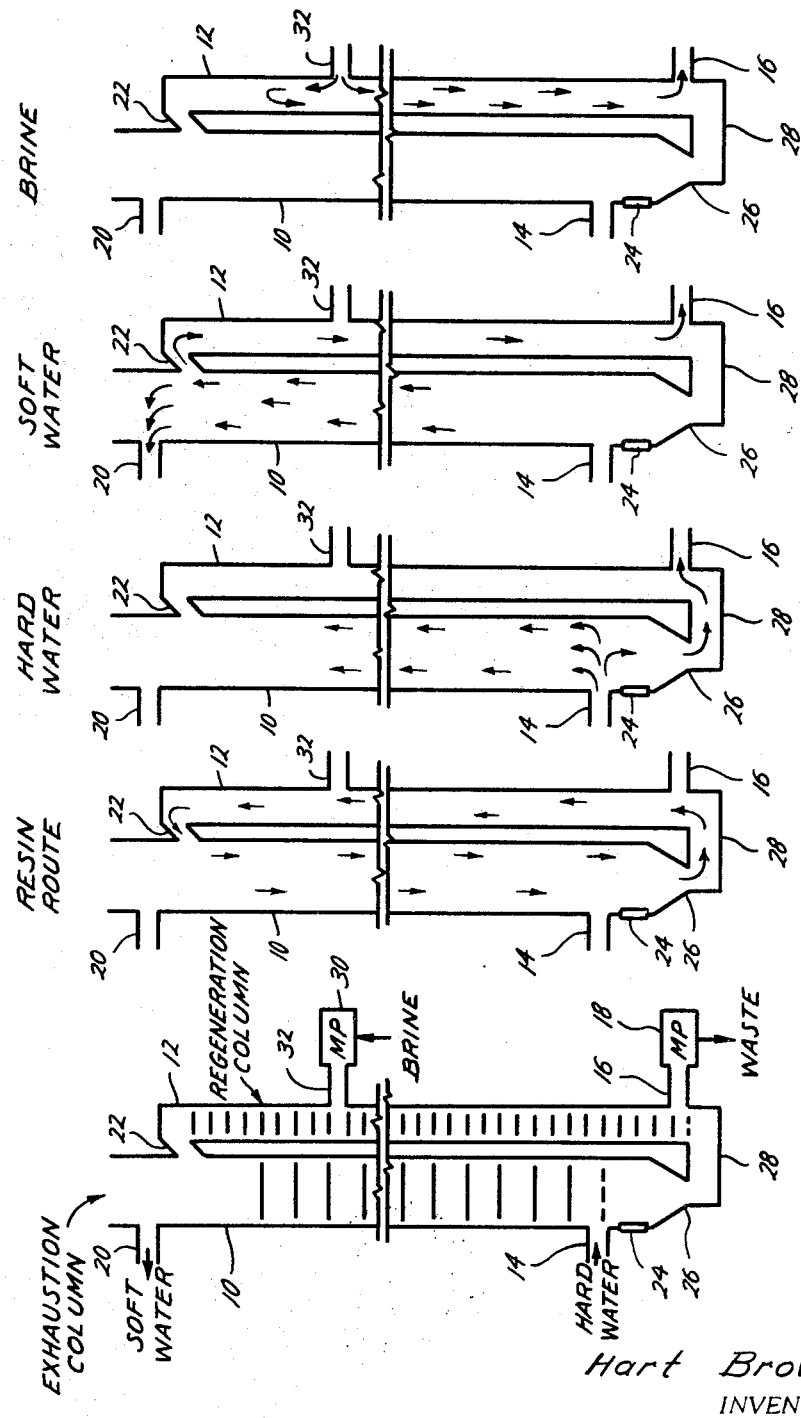

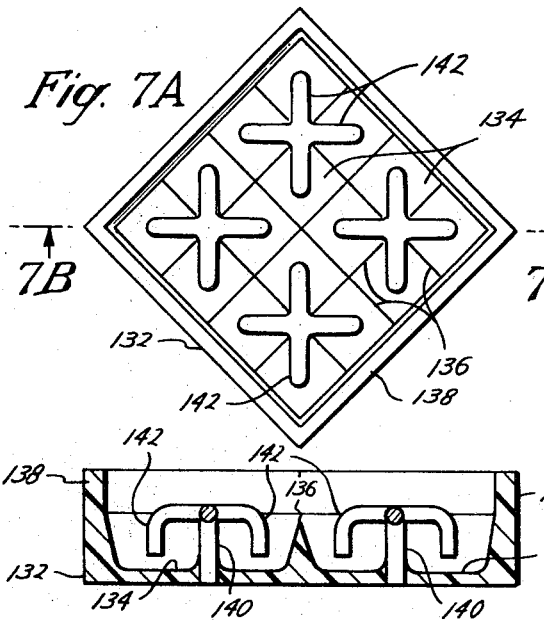
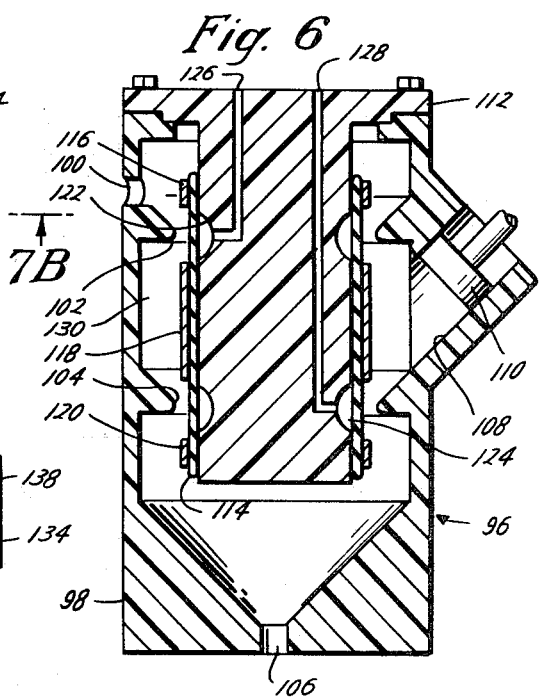
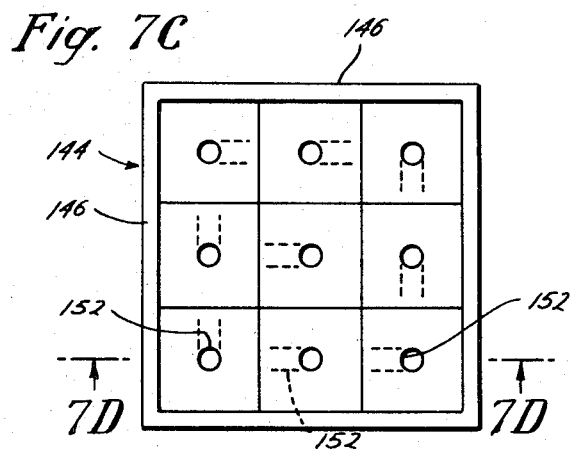
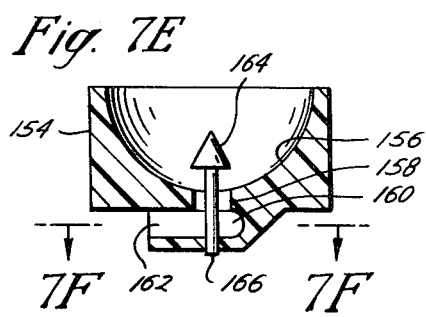
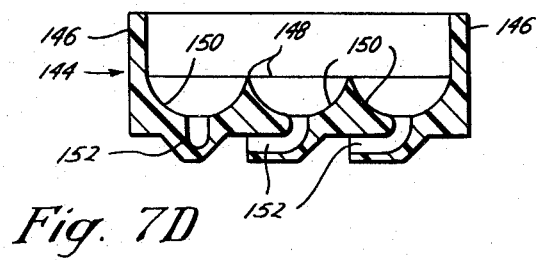
Hart Brown
INVENTOR.

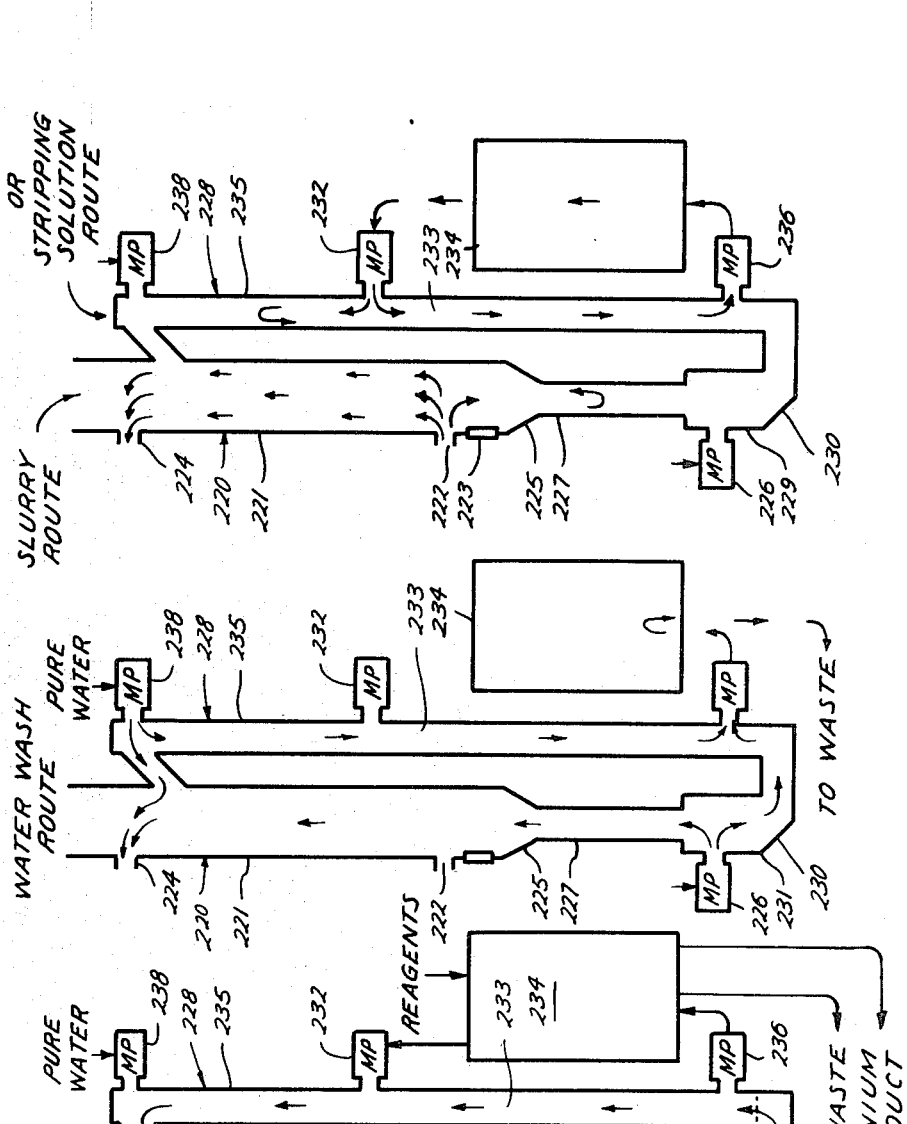

Hart Brown
INVENTOR.

CONTACT PROCESS AND APPARATUS

CROSS REFERENCE TO RELATED APPLICATION

This application is a division of my prior co-pending application, Ser. No. 701,906 filed Jan. 31, 1968, now U.S. Pat. No. 3,549,526, issued Dec. 22, 1970.

BACKGROUND OF THE INVENTION

In recent years considerable advance has been made in the development of ion exchange materials in the form of solid particles. These particles are used to effect chemical separations, such as removal of undesired dissolved solids from water (water purification and softening), recovery of valuable dissolved constituents from a fluid (hydrometallurgy, anti-pollution, preparation of chemicals), by intimately contacting the fluid with the ion exchange particles. Also, important chemical processes are carried out, during which fluids are contacted by molecular sieve particles, by catalytic particles, by other solids in particle form. Such solid particles are normally fragile and subject to attrition. For this reason, most prior fluid-solid contacting has been accomplished in packed bed vessels generally employing batch type contacting between the solid particles and the fluid. In packed bed contactors, the fluid has a tendency to channel through the solid particles which results in a reduction in contacting efficiency.

Prior countercurrent contacting methods have not been very satisfactory because of inherent leakage through the packed beds, mechanical damage to resins, expensive construction, and complex controls required.

SUMMARY

The present invention relates to an improved process and apparatus for providing contact between solid particles and a fluid. The invention includes the continuous countercurrent contact of solid particles with the fluid to be treated flowing through one vessel and a regeneration countercurrent contact of the solid particles in a second vessel with controlled movement of the solid particles in each vessel and between vessels. The present invention provides a fluid-solid countercurrent contacting which assures intimate contact of the fluid with the solid particles in each stage and prevents the solid particles from bypassing any of the contacting stages, to assure a high contacting efficiency. Additionally, the present invention includes apparatus for the controlled movement of solid particles in the contacting system causing very minor, if any, attrition of the solid particles.

The present invention may be used to carry out ion exchange processes such as water treatment, purification of sugars and polyhydric alcohols, recovery and purification of biologicals, recovery and purification of metals, solvent purification, reagent purification, preparation of sols, catalysis, and preparation of medicines.

It is therefore an object of the present invention to provide an improved process and apparatus for contacting solid particles with a fluid in a continuous system and having a high contacting efficiency.

Another object is to provide an improved process for contacting solid particles with a fluid in which the solid particles are moved in a closed loop and are maintained in a fluidized state during contacting.

Another object is to provide an improved process and apparatus for fluid-solid countercurrent contacting in two contacting zones, the solid particles in one zone being moved through said one zone in the same direction as their settling direction in such zone and the solid particles in the other zone being moved through said other zone in a direction opposite to their settling direction in said other zone.

A further object is to provide an improved fluid-solid contacting apparatus having a plurality of contacting stages in which substantially all of the solid particles are moved a single stage intermittently to progress through a plurality of contacting stages in a direction opposite the normal flow of fluid during contacting.

A further object is to provide an improved countercurrent fluid-solid contacting apparatus which may be shut down for any length of time without causing the stages of the contacting apparatus to unload the solid particles.

Still a further object is to provide an improved apparatus for positively moving solid particles with a minimum of fluid and without damaging the solid particles.

Another object is to provide a countercurrent fluid-solid contact in which the solids are moved through the column in a direction opposite the settling direction of the solid particles in the fluid.

Another object is to provide an improved continuous process and apparatus for utilizing ion exchange resins in the treatment of a fluid.

Still another object is to provide an improved continuous process for treating water with solid particles to remove impurities therefrom.

Another object is to provide an improved fluid-solid contacting process wherein the solids are contacted by two fluids with a minimum of mixing between the two fluids.

A further object is to provide an improved multi-stage fluid-solid contacting process wherein the distribution of solids among the stages is such that each stage contains substantially equal quantities of solids.

A still further object is to provide an improved fluid-solid contact apparatus in which the solid particles are maintained in a fluidized condition in a plurality of stages during contacting to prevent channeling and the solid particles are intermittently moved from one stage to the next subsequent stage in a direction opposite to the direction of fluid flow during contact whereby countercurrent fluid-solid contact is achieved.

BRIEF DESCRIPTION OF THE DRAWINGS

FIG. 2 is a schematic view of an apparatus of the present invention used to soften hard water. FIGS. 2B, 2C, 2D and 2E are schematic views similar to FIG. 2A which respectively illustrate the flow of resins, the flow of hard water, the flow of soft water and the flow of brine in the apparatus shown in FIG. 2A.

FIG. 6 is a cross-sectional view of a preferred form of a solid particle transfer or pumping device.

FIG. 7A is a plan view of a modified form of contacting apparatus in which the solid particles are moved from stage to stage in the direction of settling. FIG. 7B is a sectional view of this contacting apparatus taken along line 7B—7B in FIG. 7A. FIG. 7C is a plan view of a modified form of contacting apparatus. FIG. 7D is a cross-sectional view of this apparatus taken along line 7D—7D in FIG. 7C. FIGS. 7E and 7F are cross-sectional views of the preferred form of contacting apparatus similar to the apparatus shown in FIGS. 7C and 7D.

FIGS. 8A, 8B and 8C are sectional views of the contacting apparatus shown in FIG. 7E to illustrate respectively the fluidized state of solid particles during full flow rate contacting, the fluidized state of the solid particles at reduced flow rate through the apparatus, and the position of the solid particles in the apparatus at zero fluid flow rate.

FIG. 11A is a schematic view of an apparatus suitable for use in recovering uranium product from an enriched uranium slurry and illustrates the flow path of resins through the apparatus. FIGS. 11B and 11C are similar views of the same apparatus and illustrate the flow path of wash water (FIG. 11B) and the flow paths of the slurry and stripping solutions (FIG. 11C).

DESCRIPTION OF THE PREFERRED EMBODIMENTS

The process of the present invention provides intimate contact between a first fluid and solid particles which are retained in a closed loop, with the flow velocity of the first fluid being controlled to maintain the solid particles in a fluidized state to assure intimate and complete contact, while not allowing the resins to be carried out of the loop by the flow of the fluid. This process provides a closed loop circuit in which the solid particles are moved to provide a countercurrent fluid-solid contact. In the first portion of the circuit, the solid particles are intimately contacted by the first fluid. In such contact, the solid particles perform a specific function, such as, ion exchange, preferential adsorption, catalyst, etc. In the second portion of the circuit, the solid particles are intimately contacted by a second fluid, which fluid performs the specific function of regenerating the resins to a condition whereby they may again perform their function in the first portion of the circuit. When desirable, the above can be accomplished without causing any mixing of the first and second fluids.

The movement of the solid particles through the circuit is such that a countercurrent contact is provided in both portions of the circuit, i.e., the most active solid particles are intimately contacted by the weakest fluid in the system immediately prior to the discharge of the fluid from the system. This countercurrent contacting is repeated at successive points along the closed loop path followed by the particles. Such movement of the solid particles through the circuit is accomplished without requiring the use of separate mechanical elevating devices, for example, pumps. This is accomplished by providing for the movement of the solid particles in the first contacting portion in a direction opposite to the direction of flow of the fluid but in the normal settling direction in such fluid, and providing for the movement of the solid particles in the second contacting portion in a direction also opposite to the direction of flow of the fluid but in a direction opposite to their normal settling direction in such fluid.

Figure 1:
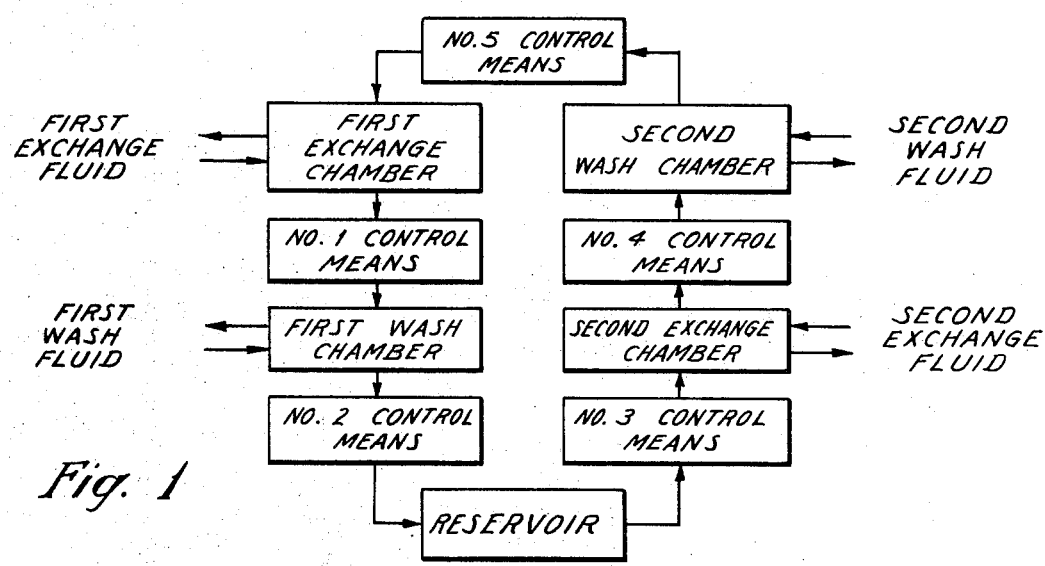
FIG. 1 is a generalized schematic flow diagram of the improved process of the present invention.

This process is diagrammatically shown in a very general form in FIG. 1. The solid particles are delivered to the first exchange chamber and are intimately and countercurrently contacted therein by the first exchange fluid. In this first exchange chamber, the solids perform their preselected function with respect to the first exchange fluid. The particles are delivered from the first exchange chamber to the first wash chamber by the No. 1 control means. In the first wash chamber, the particles are intimately and countercurrently contacted by the first wash fluid. From the first wash chamber, the particles are delivered to the reservoir by the No. 2 control means. From the reservoir, the particles are delivered to the second exchange chamber by the No. 3 control means. The second exchange fluid is brought into intimate countercurrent contact with the particles in the second exchange chamber. The particles after being delivered by the No.

4 control means to the second wash chamber are intimately and countercurrently contacted therein by the second wash fluid. The No. 5 control means delivers the particles from the second wash chamber to the first exchange chamber.

In FIG. 1, for many applications the functions of two or more control means may be combined into a single control means. In certain applications some wash chambers are not required. In other applications a third exchange chamber with accompanying wash chamber and control means may be added. For example, when used to soften water, the first wash chamber, the No. 2 control means, and the No. 4 control means are not required.

Assuming that the particles used in this process settle downwardly in the fluids used, and the circuit as shown has two vertical legs, one leg in which the particles are moved downwardly and the other leg in which the particles are move upwardly as hereinafter described, the fluid-solid particle contact is countercurrent and the particles are maintained in a fluidized state during such contact. For convenience of the subsequent discussion herein, a column in which the particles are moved in their normal settling direction is referred to as a type A column and the column in which the particles are moved in a direction opposite their normal settling direction is referred to as a type B column. It is assumed for purposes of discussion that the particles are more dense that the fluid and therefore normally settle downwardly.

The control means used to transport the solid particles between chambers moves such particles with a minimum of fluid accompanying them and also minimizes solid particle attrition.

WATER SOFTENING PROCESS

Figure 2F:
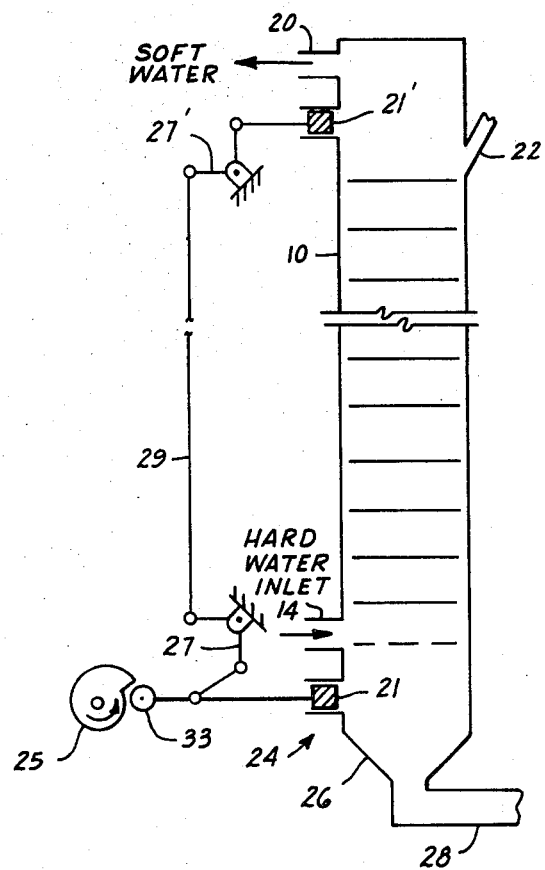
FIG. 2F is a schematic view of the apparatus showing the displacement device for moving the solid particles through the column.

The application of this process to water softening is shown in FIGS. 2A through 2E. The apparatus illustrated schematically includes the exhaustion column 10 (type A) and the regeneration column 12 (type B). Hard water containing for example, magnesium sulfate, is delivered through inlet 14 into the lower end of column 10 and flows upwardly therein through a plurality of stages providing intimate contact with resin particles as shown in FIG. 2C. The resin particles contemplated for such water softening would be a type which exchange sodium ions for magnesium ions. When delivered to column 10 such particles normally would be in the sodium form. Such resin particles, when brought into intimate contact with the hard water, exchange their sodium ions for the magnesium ions in the water, thereby converting the magnesium sulfate to sodium sulfate to soften the water and the particle exchange sites are converted to the magnesium form. Such resin particles can then be regenerated by contact with a brine (sodium chloride solution) whereby the particle exchange sites are converted to the sodium form and the magnesium ions form magnesium chloride in solution which is discharged from column 12 as waste through outlet 16 under control of metering pump 18. The soft water is discharged from column 10 through the upper outlet 20.

Resin particles are delivered from column 12 through duct 22 into the upper end of column 10. Since the flow of hard water into the column 10 preferably remains substantially constant, the resin control means 24 is operated to provide an intermittent flow of water downwardly in column 10 whereby the resin particles are moved downwardly one stage or tray at a time. Thus, with the water flowing normally upwardly through column 10, it is initially contacted by the resin particles already nearly depleted of sodium ions and as it nears the top of column 10, it is contacted by resin particles having essentially all of their exchange sites in the sodium form, thereby providing a countercurrent type of intimate contact between the water and resin particles.

The resin control means 24 may be any means which will create a controlled short duration downflow of fluid in the entire columnar assembly of contacting stages between water inlet 14 and resin inlet 22. A simple form of such displacement device shown in FIG. 2F employs a piston 21 movable in a cylinder installed at 24 in the column 10, wherein the piston 21 may be driven by the cam follower 23 responsive to cam 25 so that the piston 21 slowly entering the cylinder slowly displaces fluid up the column 10 over an extended time period, then responding to cam action the piston 21 quickly withdraws in the cylinder creating a sudden downward movement, or pulse, of the entire column of liquid in column 10 above means 24. To use this control means the surface of liquid just above the outlet 20 is usually held at atmospheric pressure. In the event the column must be sealed from contact with the atmosphere, or that the column must be operated at elevated pressure, a second piston 21 and cylinder of same displacement may be installed in column 10 at the same elevation or above inlet 22. Such second piston 21 is suitably linked by cranks 27', link 29 and crank 27 to the first piston 21 so that the two pistons move simultaneously so as to create equal and opposite volume displacements in the column 10. This simple means has one shortcoming, namely that the sudden downward pulse starts while the resin particles in each stage compartment are highly fluidized by the upflowing contacting fluid. Thus to transfer substantially all particles out of one stage compartment into the one next below may require a downflow of a total volume several times greater than is required when the resins are settled and at rest at the beginning of the downward pulse. The greater the total volume pulsed down, the greater must be the height of each stage-compartment to assure minimum mixing of particles in adjoining compartments during the pulsing operation. It therefore is desirable to minimize the total volume pulsed downwardly in the column. Also it is difficult to transfer duplicate volumes of resins downwardly at each pulse if the fluid upflow rate is different during different pulse occurrences. One way to overcome this problem is to allow the resin particles to settle onto the perforate plates immediately prior to starting the downward pulse. This may be accomplished by use of a cam design which moves the piston outwardly at a rate sufficient only to compensate for the incoming hard water just long enough for the resins to settle, then produce the transfer of particles by downflow through the stages. A preferred method uses the following procedure: (1) stop the hard water inflow at 14, (2) delay one or two seconds to allow the resin particles to settle, (3) actuate the displacement means creating the sudden down pulse of a preselected volume to transfer predetermined volume of resins, and (4) resume inflow of hard water after waiting a short interval allowing resin particles to settle sufficiently so that resumption of upflow does not return lost particles upwardly through the next higher tray.

The resin particles from the reservoir 26 in column 10 are delivered to the lower end of column 12 by the resin transfer means 28 as shown in FIG. 2B. Such resin transfer means 28 not only delivers the resin particles to column 12 with a minimum of water from column 10, but may also be designed to provide an intermittent reversal of the flow therein to cause the resin particles to progress upwardly therein one stage or tray at a time.

When used for water softening, the preferred form of the resin transfer means 28 is substantially a cyclic positive displacement metering pump which periodically removes a preselected volume of a slurry consisting of water and resin particles from the reservoir 26, and periodically delivers same to the base of the regeneration column 12. In addition to positively moving the metered volume of resins and water from the base of column 10 into the base of 12, the resin transfer device 28 prevents any other movement of water or resins between the two columns. This blockage assists the proper functioning of the resin control means 24.

The cycling of resins downward through column 10 is substantially independent of the cycling of resins up through column 12 in that resins are periodically moved down in column 10 at intervals only sufficiently frequent that the resins become properly loaded with hardness by the time they reach the base of column 10. Such cycling may be controlled by a sequencing timer or by a water meter when the hardness of the entering water is relatively constant. When the hardness varies from time to time, the cycling time may be controlled by a hardness sensor placed several trays below the top tray in column 10. Thus, the rate at which resins enter the reservoir 26 depends upon the total quantity of hardness removed per unit time from the water being treated.

The cycling frequency for column 12 may conveniently be set at the maximum which allows the resins to be regenerated properly as they ascend through column 12. A photocell inserted in the lower part of reservoir 26 (together with a suitable light source) can sense when resins cover the photocell. When the photocell is covered, its signal can be used to keep the column 12 cycling continuously, and thus transporting resins upward through column 12 and into the top of column 10 at the maximum capacity of the regeneration column 12. When such continuous periodic removal of resins from reservoir 26 uncovers the photocell, its signal stops the cycling of the regeneration column 12 until column 10, by its independent action, refills the reservoir 26. This control arrangement therefore automatically governs the system operation.

Brine is delivered by metering pump 30 through inlet 32 to an intermediate position in column 12. As shown in FIG. 2E, some of the brine may move upwardly in column 10 above inlet 32 into the washing section but the downward flow of the wash water is controlled to wash the brine from the resin particles and to prevent the brine from reaching the top of column 12. The brine flows downwardly through the plurality of contact stages in column 12 in intimate contact with the resin particles at each stage and exchanges the sodium ions from the brine for the magnesium ions on the resin particle exchange sites. As mentioned, the spent brine is discharged from the lower end of column 12 through outlet 16 under control of metering pump 18. The resin particles reaching the top of column 12 are carried through duct 22 into column 10. The soft wash water for the upper end of column 12 is provided through duct 22 from the upper end of column 10 as shown in FIG. 2D. The volume of brine injected into column 12 is determined by the volume of resin particles that move up through column 12 so as to assure that there are sufficient sodium ions available to adequately regenerate the resin particles. The discharge from column 12 is controlled by metering pump 18 and is somewhat greater in volume that the brine injected plus the hard water carried over with the resin particles from column 10 so as to assure an adequate flow of wash water into the top of column 12. Thus, the flow of wash water not only serves to wash the regenerated resins free from brine but also serves to dilute the brine to the desired concentration.

Thus, in this water softening process, the hard water is softened in the column 10 by ion exchange with the resin particles which are positively moved downwardly in column 10 and the brine regenerates the resin particles which are positively moved upwardly in column 12 as shown in FIG. 2B. The resin control means 24 and the resin transfer means 28 are controlled to move the resin particles in the closed loop at a rate to assure the desired softening of the water the the most efficient use of the sodium ions in regenerating the resin particles.

SOLID PARTICLE ACTION — TYPE A COLUMN

Figure 3A:
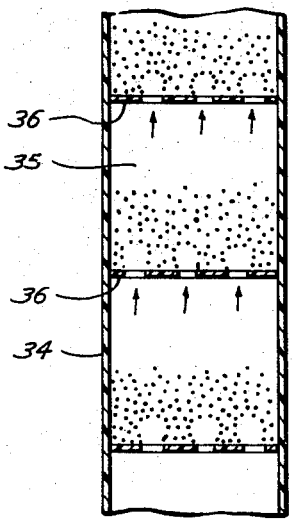
FIG. 3A is a schematic view of a simple contact apparatus illustrating the fluidized condition of the solid particles during contact.

The process of the present invention, as previously described, maintains the solid particles in a fluidized condition during periods of contact. FIG. 3A illustrates a simple type A column 34 having perforated trays 36 extending transversely across the interior of the column 34. As indicated by the arrows, the fluid within the column 34 flows upwardly, passing through the perforations in each tray 36, and is in intimate contact with the solid particles between the trays. The size of the perforations are predetermined to provide sufficient fluid velocity therethrough to prevent the solid particles from dropping through the perforations during upward fluid flow and to fluidize the solid particles above the tray to avoid channeling of the fluid through the particles. The rate of fluid flow between trays should be less than, but almost equal to, the rate of settling of a specified size of solid particles in the fluid so that particles are not carried by the flow to the next higher tray while maintaining nearly maximum expansion and fluidization of the particles between trays.

In this perforate tray type A column, control of the fluid velocities is accomplished by preselecting the ratio of flow area through the perforations in the trays to the flow area of the column between the trays and controlling the rate of fluid introduced into the column. It is generally preferred that the flow area through the tray perforations be between 10 to 20 per cent of the flow area of the column between trays. Also, the individual perforations are preferred to have a diameter from three to six times the diameter of the largest solid particle to be used to assure that the particles do not bridge over a perforation when the particles are being transported downwardly in the column.

Figure 3B:
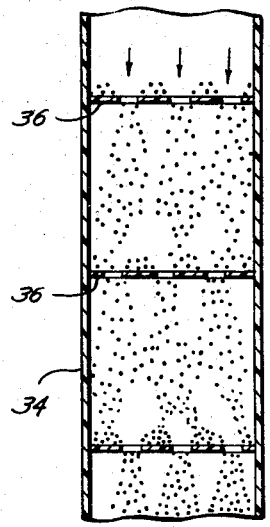
FIG. 3B is a similar view illustrating the periodic movement of the solid particles to the next lower tray to show the possibility of some solid particles bypassing a contacting stage or tray during such movement.

The solid particles are intermittently moved downwardly from one tray to the next lower tray. This movement of the solid particles is accomplished by reversing the fluid flow to cause all of the fluid to flow downwardly within column 34 a distance that is sufficient to carry the resins from the contacting compartment 35 through the tray 36 and into the contacting compartment 35 next below. It is generally preferred to stop the upward fluid flow for a short period of time before reversing the flow. This period of no flow allows the particles to settle downward toward the tray to thereby minimize the volume of flow reversal needed to transfer the particles. The effect of such flow reversal on the solid particles within column 34 is shown in FIG. 3B. The solid particles are carried downwardly through the perforations in trays 36 and when the fluid flow returns to the upward direction, the particles which have been moved are fluidized on the next lower tray as shown in FIG. 3A.

FIG. 3B illustrates some problems commonly encountered in the use of the perforated trays 36. Some of the particles on the tray are not carried down to the next lower tray when the fluid flow reverses. In the preferred process of the present invention, it is desired that all solid particles be moved to the next lower tray which would assure a uniformity of condition of all of the solid particles on each tray. The holdover of particles on a tray can be minimized by proper location, quantity and size of the perforations in trays 36. Also, in the transport or movement of the particles to the next lower tray, the first particles to pass through the perforations may reach the next lower tray and pass through its perforations before the flow reversal is completed. This bypassing of residence in a contacting stage or tray by the particles is undesirable.

Figure 3C:
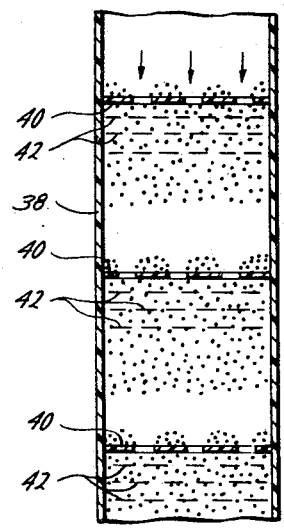
FIG. 3C is a schematic view of a similar contacting structure illustrating the function of the delay baffles to prevent solid particles from bypassing a contacting stage or tray.

The aforementioned particle bypassing may be minimized by modifying the column as shown in FIG. 3C. The modified column 38 includes the transverse perforate trays 40 and also includes a means for delaying the passage of solid particles downwardly through the space between trays 40 after they have passed through the tray perforations responsive to flow reversal. Such delay means, as illustrated, takes the form of perforate plates or baffles 42 positioned below each tray 40. This delay means has been found to be effective to prevent particles from bypassing residence in a contacting stage. Perforate plates 42 are preferred to have a large ratio of perforate area to solid area, compared to the ratio used for a working tray 40.

Figure 3D:
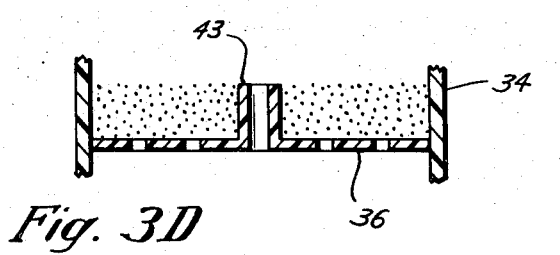
FIG. 3D is a schematic view of a similar contacting apparatus having means to regulate the quantity of solids which remain in each stage during contacting upflow by fluid.

Continuous operation of a column comprised of a vertical assembly of perforate plate trays sometimes results in the collection of a large excess of particles on one tray accompanied by a severe shortage of particles on another tray in the same assembly. This indicates a need for a means to regulate the normal particle thickness on each tray. Such a regulating means is shown in FIG. 3D. A chimney 43 is installed on about five per cent of the perforate holes. The interior diameter of the chimney is the same as that of the perforation in the plate. The chimney regulates the particle bed thickness to be substantially equal to the chimney height by conducting particles through the chimney only when the bed thickness exceeds the chimney height.

While a type A column having only perforate trays for providing the desired plurality of stages of intimate fluid-solid contact may be used successfully, they are subject to the disadvantage that they allow a major portion of the particles to settle through the trays to the bottom of the column when the fluid flow is stopped for an extended period of time. This solid particle unloading necessitates a start-up period of operation when the fluid flow is thereafter resumed to redistribute the solid particles properly on each of the contacting trays before efficient countercurrent contact may again be established. During such start-up period, the process is not effective to perform its desired function. This unloading of the column during shutdown may be readily overcome by proper design of the contacting apparatus as hereinafter explained. It is recognized, however, that this disadvantage may not be a sufficient factor to require the adoption of a more complex contacting apparatus, particularly where the process is intended to operate continuously. It is, however, a major factor in applications where the process is intended to operate on an intermittent basis.

A practical application of the type A column using the perforate plates as illustrated in FIGS. 3A, 3B, 3C and 3D is one in which it is anticipated that the flow of fluid up through the column will not be discontinued, which would cause particles to fall to the bottom of the column. However, shut-down periods will occasionally occur for servicing of some of the external components, or because of loss of the external fluid supply, power failures, etc. A start-up period would then be necessary in order to return the column to a status of efficient operation. A practical solution to such contingencies would be to provide auxiliary means to maintain a very low flow rate just sufficient to prevent particles falling through perforations. Such minimal flow of the regular contacting fluid could often extend the interval long enough between necessary particle transfer pulses to permit required servicing of external controls. When a longer interval is required, auxiliary pumping means may be used to circulate fluid from the outlet of the column back to the inlet, a practice which usually would not upset the chemical balance of the column.

SOLID PARTICLE ACTION — TYPE B COLUMN

As previously explained, a type B column provides an intimate countercurrent contact between a fluid and solid particles in which the solid particles are moved through the column in a direction opposite to their settling direction in the fluid. As in the type A column, it is preferred that the fluid-solid contact occur with the solid particles in a fluidized state resulting from the flow of fluid through the particles.

Figure 4A:
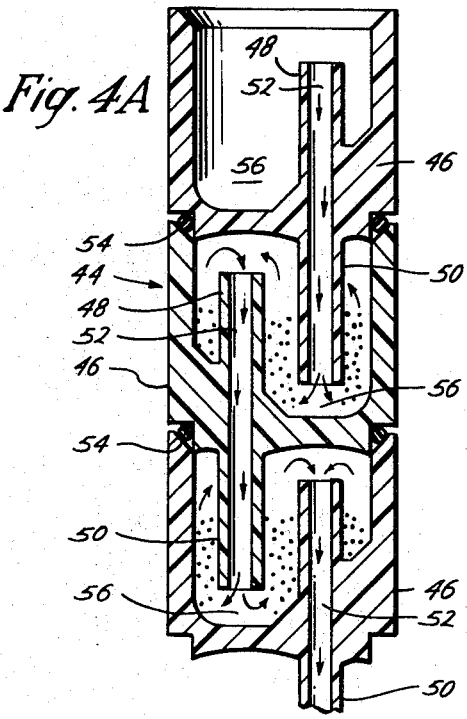
FIG. 4A is a cross-sectional view of a contacting structure illustrating the fluidized condition during contact.
Figure 4B:
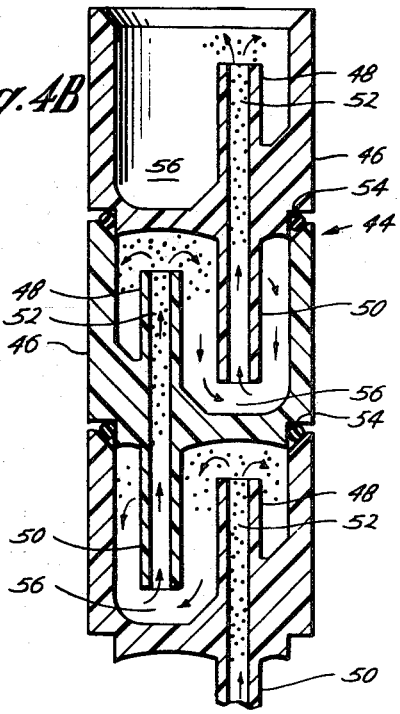
FIG. 4B is a view of the same structure but illustrating the movement of the solid particles to the next higher contacting stage which movement is in a direction opposite to the normal settling direction of the solid particles in the fluid.

The contacting apparatus shown in FIGS. 4A and 4B provides the aforementioned fluid-solid contact and the progressive upward movement of solid particles in a fluid in which they normally settle downwardly. The column 44 includes a plurality of cups 46. Each of the cups 46 is formed to have an upwardly extending tubular projection 48 and a lower tubular projection 50, offset to one side of the cup and defining the passage 52 communicating through the cup. The cups 46 are assembled as shown with the projections 48 and 50 positioned to the opposite sides of the column 44 from the projections of the adjacent cups. Suitable sealing means, such as, O-rings, are provided between cups as shown, to make the column fluid-tight.

The normal contacting flow of fluid through column 44 is downwardly as shown in FIG. 4A. The fluid flows downward through the passage 52 into the bowl 56 of the next lower cup 46. The solid particles collect in the bowl 56, which is sloped downwardly toward the position immediately under passage 52. As the fluid flows upwardly within the bowl 56, it fluidizes the solid particles and intimately contacts them. To prevent particle carryover to the next passage, the size of cups and the rate of fluid flow should be preselected so that the fluid flow velocity in the upper portion of the bowl is less than the settling rate of the solid particles in the fluid. The fluid exits from the bowl 56 into the passage 52 and similarly flows through each succeeding lower cup or contacting stage.

When the solid particles have remained in the contacting stage for a desired period of time, the fluid flow is reversed to cause the solid particles to be moved to the next higher cup 46. This action is shown in FIG. 4B. Before reversing the fluid flow, such flow is preferred to be stopped thereby allowing the particles to collect in the lower portion of the bowl 56 to minimize the volume of reverse fluid flow required to move the particles. In the reverse flow, the fluid passes upwardly through the passage 52, flows downwardly in the bowl 56 and carries the solid particles up the passage 52 into the next higher bowl 56. This flow reversal is a controlled volume of flow and is preferred to be just enough volume to transport the solids in each stage or cup to the next higher stage or cup. In this manner, a countercurrent contacting is established in the column 44 with the fluid normally flowing downwardly and the solid particles being transported upwardly through the column one stage at a time. Thus, intimate countercurrent contact is established between the solid particles and the fluid and the movement of the solid particles progresses upwardly through the column in a direction opposite to their settling direction in the fluid. The design and use of the type B column allows a complete closed loop circuit to be established which eliminates the need for any specific elevating device, other than the type B column, to return the particles to the top of the type A column.

While the foregoing discussion has assumed that the settling direction of the solid particles in the fluid is downward, the process and apparatus of the present invention is equally applicable to the contacting of solid particles which normally rise when submerged in the fluid. It is suggested, however, that such normally rising solid particles may be used by inverting both of the columns so that in the type A column, the solid particles travel upwardly therethrough and in the type B column, the solid particles are moved downwardly, thereby providing the closed loop circuit for the movement of the solid particles.

In discussing the process and apparatus of the present invention, reference is made to the contacting of solid particles with a fluid. It is believed that the present process is applicable to gases, liquid and liquid slurries. The inclusion of gas in a column, as hereinafter described, may dampen the reverse flow pulse in remote portions of the column from the pulse source sufficiently so that the transport of solid particles may be adversely affected. This is particularly true in the type B column. Another problem which should be considered in the operation of the columns in a gaseous system results from the presence of small amounts of moisture which causes the solid particles to adhere to the column structure and to each other. Further, such moisture may coat the solid particles and thereby prevent intimate contact between the gas and the solid particles. Therefore, as used herein, the term "fluid" is intended to include liquids, liquid slurries and only those gases and combined liquids and vapors which have the characteristics enabling them to fluidize the solid particles during contacting flow and to transport the particles, as described, responsive to reverse flow pulses.

SOLID PARTICLE CONTROL MEANS — METERING PUMP

As previously explained, it is desirable to transfer the solid particles from one column to the other column with a minimum of fluid carry-over while preventing damage to the solid particles and backflow of fluid through the control means. Also, the transfer means, such as the particle transfer means 28 in the water softening system of FIG. 2A should be capable of being controlled so that it periodically transfers a predetermined amount of solid particles and volume of fluid from one column to the other. FIGS. 5A through 5G illustrate the structure and operation of a transfer means, hereinafter referred to as a particle transfer means or metering pump 58.

The pump 58 includes a body 60, the cover 62 and the diaphragm 64. The body 60 defines the inlet port 66 which communicates with the inlet chamber 68 defined in the body 60 above the inlet valve seat 70. The body 60 also defines the displacement chamber 72 above the outlet valve seat 74 and the outlet chamber 76 which is in communication with the outlet port 78. The diaphragm 64 is secured to the cover 62 by suitable means such as strips 80. The diaphragm 64 consists of three working portions. The inlet valve portion 82 of diaphragm 64 is adapted to be moved responsive to pressures in the upper valve chamber 84 in cover 62 into and from engagement with the inlet valve seat 70. The pumping or central portion 86 of diaphragm 64 is adapted to be moved responsive to pressures in the pumping chamber 88 into the displacement chamber 72 to control the volume of fluid and particles therein. The outlet valve portion 90 of diaphragm 64 is adapted to be moved into and from engagement with outlet valve seat 74 responsive to pressure in lower valve chamber 92. As shown, the body 60 defines ribs 94 which project into the central displacement chamber 72 to limit the movement of the central portion 86 of diaphragm 64 into the displacement chamber 72. The valve seats 70 and 74 are both contoured as shown in FIG. 5F to assure tight-seating engagement of the respective diaphragm portions thereon.

Figure 5A:
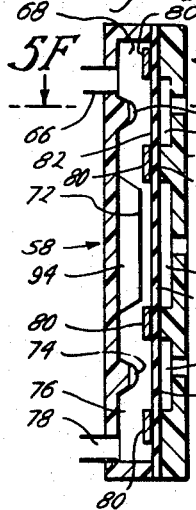
FIG. 5A is a cross-sectional view of a solid particle transfer or pumping device.
Figures 5B, 5C:
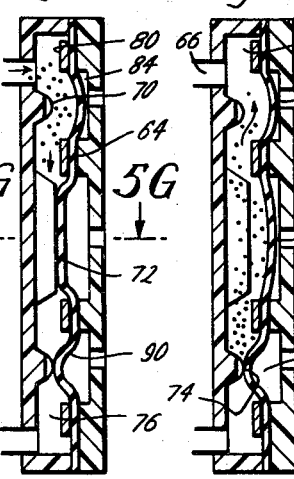
FIGS. 5B, 5C, 5D and 5E illustrate respectively the intake of solid particles and fluid through the inlet port, the passage of the solid particles and fluid past the inlet valve into the displacement chamber, the seating of the inlet valve and the opening of the outlet valve and the discharge of the solid particles and fluid through the outlet port.
Figure 5D:
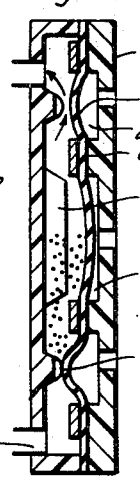
Figure 5E:
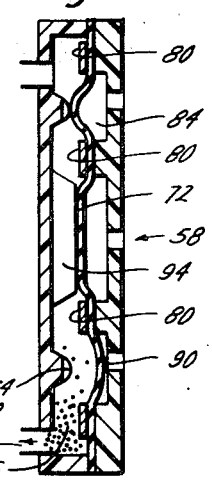
Figure 5F:
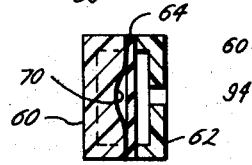
FIG. 5F is a sectional view taken along line 5F—5F in FIG. 5A to illustrate the inlet valve.
Figure 5G:
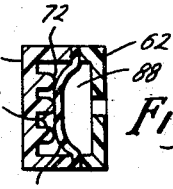
FIG. 5G is a sectional view taken along line 5G—5G in FIG. 5A to illustrate the configuration of the central chamber of the apparatus.

The sequence of operation comprising one complete operating cycle of pump 58 is illustrated in FIGS. 5B through 5E. In FIG. 5B, the inlet valve 82 is open and fluid and solid particles are being drawn into the displacement chamber 72 by the movement toward the right of diaphragm 86. FIG. 5C represents the period after the intake during which all diaphragms are stationary while the solid particles are allowed to settle in the displacement chamber 72. The arrow shows upward flow of fluid displaced by particles falling through the inlet valve. FIG. 5D shows the inlet valve closing and the arrow shows upward flow of fluid displaced by the closing motion of the inlet valve diaphragm 82. This upward flow washes any remaining particles from the inlet valve seat 70 as the valve closes. In FIG. 5E most of the fluid and solid particles have been moved out through the open outlet valve by the leftward movement of diaphragm 88. The straggling particles remaining in the displacement chamber are settling through the open outlet valve. Simultaneously a volume of fluid equaling the particle volume is displaced and moves upward through the outlet valve, as indicated by the arrow.

The movement of particles and fluid through this device is controlled solely by the action of the three diaphragm segments. Since the movement of each diaphragm segment is separately controlled, the sequence of events illustrated by FIGS. 5B through 5E represents one manner of using the device. Obviously, this sequence may be varied as conditions dictate; for example, in one application, it has been found convenient to employ a sequence in which the inlet valve closes simultaneously with the opening of the outlet valve, and later in the cycle the inlet valve opens simultaneously with the closing of the outlet valve. Despite this departure from ideal operating theory, it was found that the rapid fluid movement occasioned by quickly closing the valves, successfully washed all particles off of the valve seats. In other applications, a continued small movement of the displacement chamber diaphragm 88, concurrently with the closing of either valve may be used to create an upward flow of fluid, out of which the particles previously have settled, across the outlet valve seat or the inlet valve seat, as requirements dictate, in order to completely wash those seats clean of particles as the respective valves close.

The preferred form of fluid transport device or metering pump 96 is shown in FIG. 6. The pump 96 employs a set of cylindrical diaphragms in place of the flat diaphragm illustrated in FIGS. 5A through 5G. This pump 96 provides valves which open fully to increase the throughput capacity per unit length of valve seat, and has a structure enabling convenient servicing of the device. In this design a horizontal cross-section is cylindrical thereby providing economy of manufacture. This preferred form as shown in FIG. 6 includes an upper inlet valve, a lower outlet valve, and a central displacement chamber therebetween having means for controlling and changing the volume of the central displacement chamber. The body 98 of pump 96 defines the inlet 100, the inlet valve seat 102, the outlet valve seat 104 and the outlet port 106. Seats 102 and 104 are both annular and extend inwardly into the space defined by the body 98. Body 98 defines the cylinder 108 in which piston 110 is positioned to provide the volume changing means. The core 112 is positioned centrally within body 98 as shown and is provided with suitable means (not shown) to secure it in such position. Tubular diaphragm 114 is positioned in surrounding relation to core 112 and is secured by the three bands 116, 118 and 120 to core 112. The diaphragm 114 may be divided into two separate units, each being secured by two bands. The core 112 defines upper annular groove 122 and lower annular groove 124. As shown, diaphragm 114 extends across the grooves 122 and 124 and is free to expand outwardly responsive to pressure within the respective grooves. The upper groove 122 is positioned radially inward of inlet valve seat 102, so that when the portion of diaphragm 114 covering groove 122 expands outwardly, it engages valve seat 102. Also, groove 124 is radially inward of outlet valve seat 104 so that when the portion of diaphragm 114 covering groove 124 expands outwardly, it engages valve seat 104. Passage 126 communicates with groove 122 and passage 128 communicates with groove 124 so that the portions of the diaphragm 114 covering the grooves may be independently expanded and contracted into and from seating engagement with their respective valve seats to thereby function as inlet and outlet valves.

The sequence of operation of metering pump 96 is substantially the same described in relation to metering pump 58. The inlet and outlet valves are actuated by pressures applied through passage 126 to groove 122 and through passage 128 to groove 124, respectively. Application of such pressure expands the portions of the tubular diaphragm 114 causing it to contact the respective valve seats creating the desired valve closure. Piston 110 in cylinder 108 represents means to vary, in a controlled manner, the volume of the displacement chamber 130. If desired, diaphragm means or other displacement means may be substituted for the piston and cylinder illustrated.

The relative action and reactions between the movement of inlet valve, displacement chamber volume changes, movement of outlet valve, particle settling, flushing of valve seat immediately prior to valve closure, all duplicate those described regarding operation of metering pump 58. The major advantage of metering pump 96 over that of metering pump 58 is that it may be constructed easily in sizes capable of handling relatively larger volumes, and its valve design does not have corners which may trap particles.

Slight changes in the sequence of operations of the valves and of displacement piston 110 permit this particle transport device or metering pump to perform its functions with the same flexibility exhibited by metering pump 58.

When either pump 58 or pump 96 is operated at reasonable capacity of particle throughput, and when sufficient time is allowed for particles to settle as described hereinabove, valves do not close on resin particles. However, as the throughput of particles is increased, and the capacity of the device is taxed, particles occasionally are trapped between the valve seat and the diaphragm by the closing of a valve. Use of a soft natural or synthetic rubber material for diaphragm 114 permits operating of the device at these higher capacities where occasional particles are trapped, with only minimal, if any, damage to particles even through they are quite fragile.

The primary use of the metering pumps 58 and 96 described heretofore has been to function as a resin transfer device between two columns. The pumps also may perform a dual role. In addition to transferring a metered volume of particles out of type A column into type B column, the pump sometimes also serves as the control means which moves the particles through the type B column, such as column 12 in FIG. 2A.

Thus, the particle transfer devices or metering pumps provide the means for controlled transfer of solid particles between columns in which the amount of fluid transferred with the solid particles is controlled and damage to fragile solid particles is minimized. The particular particle transfer devices described may also be used to pump a metered volume of liquid which volume may be varied to preselected amounts within size limits of the devices simply by controlling the actuation of the displacement means. These particle transfer devices have been described with reference to solid particles which have a density greater than the density of the fluid accompanying them. These same devices are suitable for transferring fluids with solid particles which have a density less than the fluid; however, in such use the devices are inverted to position the inlet valve below the outlet valve so that particles settling upward move toward the outlet.

It is further contemplated that by providing a positioning of the inlet valve, the displacement chamber and the outlet valve so that solid particles tend to settle toward and through the outlet valve all combinations of fluids and solid particles may be transferred by the transfer means of the present invention. For example, in pumping liquid and solid particles wherein the solid particles are less dense than the liquid and settle therein in an upward direction, the pumping devices should be inverted from the position shown and described so that the outlet is above the inlet and to thereby allow solid particles to settle toward the outlet.

CONTACTING STRUCTURES FOR TYPE A COLUMN

FIGS. 7A through 7F disclose contacting structures which are intended for use in providing fluid-solid contact in a type A column, that is, a column in which the solids are progressively transported through the column in the direction in which they settle in the fluid. Each of these structures is designed to direct the upflowing fluid through the solid particles to cause the particles to be in a fluidized state during contacting. Each structure is also intended to move substantially all of the solid particles only one stage (to the next lower structure) with each reverse flow pulse imparted to the fluid in the column. Also, these structures prevent unloading of the column (the settling of solid particles through the trays to the bottom of the column) when the fluid upflow through the column is discontinued for an extended time.

FIGS. 7A and 7B illustrate one form of contacting structure or tray 132. The tray 132 is shown to be formed of a suitable plastic, such as, polypropylene and defines a plurality of contacting bowls 134. As shown, tray 132 is square in shape and the bowls 134 are defined by a plurality of upstanding ridges 136 extending across the upper surface of tray 132. The ridges 136 have a pointed upper surface and sides which slope downwardly and inwardly toward the center of each bowl. The tray 132 also includes the upstanding walls 138 which function to define the sides of the outer bowls and to provide adequate spacing for an assembly of a plurality f the trays 132 into a contacting column. The tubes 140 extend through the tray 132 and each connects to four depending tubes 142. Each of tubes 142 open downwardly immediately above the center of one of the bowls 134. Thus, a communication is provided from the space below the tray 132 to the central portion of each of the contacting bowls 134.

In operation, contacting fluid flows upwardly through the tubes 140 and is distributed through the tubes 142 downwardly into the bowls 134. The solid particles on the tray 132 are fluidized within each bowl 134 to provide an intimate contact with the fluid. When it is desired to move the solid particles downwardly to the next tray in the column, the upflowing fluid is stopped and reversed. The solid particles are picked up in each bowl by the reverse fluid flow and conducted through tubes 142 and 140 and are discharged into the space below tray 132. Merging the four passageways 142 into the single passageway 140 is for convenience of construction only. If desired, each of the passageways 142 could be connected through the tray 132 into the compartment next below.

The structure of tray 132 clearly prevents solid particle unloading during shutdown. Also, the central positioning of the open end of tubes 142 in each of the bowls and the sloping sides of the bowls 134 assures that substantially all of the solid particles are moved to the next lower tray with each reverse flow pulse. Particle bypassing of trays in this type column may be excessive for the reasons portrayed in FIG. 3. However, such bypassing may be reduced by various means, for example, baffles shown in FIG. 3C or horizontal passageways shown in FIGS. 7C and 7D.

The tray 132 may be constructed as shown having sixteen of the bowls 134 or any other suitable multiple of four which provides sufficient solid particle and fluid flow capacity.

The structure of tray 144 shows in FIGS. 7C and 7D is another form of structure which may be used for a type A column. The tray 144 is shown to be formed of a plastic material because of the ease with which such material may be formed to produce the desired shape and chemical inertness. The tray 144 includes the walls 146 extending upwardly around the exterior thereof and a plurality of ridges 148 extending upwardly to define a plurality of contacting bowls 150. Each of these bowls 150 is generally cup-shaped. The tray 144 defines the passages 152. Each of the passages 152 extends downwardly from the central portion of its bowl 150 and turns to a horizontal direction terminating in communication with the space below the tray 144. The direction in which the horizontal portion of the passage 152 extends from the vertical portion is best shown in FIG. 7C. It is generally preferred that such passages 152 be oriented with respect to each other to provide a circular flow of fluid and solid particles below each tray during the transport of the solid particles to the next lower tray. This motion assists in maintaining the solid particles above the next lower tray until the reverse pulse is completed. The underside of the tray 114 is substantially flat to allow a plurality of the trays 144 to be assembled into a contacting column. In such assembly, the upper edge of the walls 146 of one tray are adapted to seal against the lower surface of the next higher tray.

In operation, upflow of fluid through tray 144 proceeds through the passages 152 into the central portion of each of the contacting bowls 150. The upwardly flowing fluid passes through the solid particles which tend to settle into the cups, causing them to be fluidized and thereby assures that each particles is available for intimate contact with the fluid. The fluid flow rate is controlled in conjunction with the flow area of the passages 152 and the flow area above the bowls 150 to assure that during contacting, the solid particles remain in their respective compartments, i.e., the particles are not carried by the flow to the next higher tray and they do not settle through the passages 152 to the next lower tray.

With respect to tray 144 it should be noted that the horizontal portion of passage 152 is preferred to extend a horizontal distance of at least twice the height of the horizontal part of the passage. This horizontal portion of the passages 152 prevents the unloading of the column when the fluid upflow stops.

The transport of the solids is accomplished by a short duration reversal (or pulse) of the fluid upflow through the column. As previously explained, the flow may be stopped momentarily before the reverse pulse to allow the solid particles to settle into the bowls 150 and the passages 152. The reverse flow conducts the solid particles through the passages 152 where they are discharged horizontally below the tray into the compartment next below, producing a generally circular flow pattern therein. The generally circular horizontal flow pattern so generated delays the downward progress of the particles through the upper part of the compartment to minimize the number of such particles which are carried through two trays during one reverse pulse. In use of tray 144, there is a tendency for the particles nearest the central axis of each bowl 150 to be moved downwardly on flow reversal in preference to the particles near the edge of each bowl.

As can be seen from the drawings, the bowls 150 are square at their upper edges and have a circular cross-sectional shape in their lower portion. It is d-sired to have the bowls 150 of the largest dimension possible for economic considerations. However, contacting efficiency may be reduced with an increase in bowl size beyond a certain dimension. This reduction in contacting efficiency is believed to be caused by an accumulation of particles part way between the cup perimeter and the floor of the bowl, which particles remain substantially stationary during the upflow of fluid.

The preferred form of type A column contacting apparatus, as shown in FIGS. 7E and 7F, allows the use of a large size bowl without any loss of contacting efficiency. The cup 154 shown in FIG. 7E may be used as a tray or a plurality of such cups may be formed into a single tray. The cup 154 defines the upwardly facing bowl 156 which may be circular or square at its upper edge. The upper edge of cup 154 is preferred to have an upper square configuration when several of the cups are to be combined to form a single tray. In such tray, the ridges separating the individual bowls are preferred to have a fairly sharp upper edge so that particles do not rest on the upper edges of the dividing ridges.

The cup 154 defines the port 158 communicating from the central portion of bowl 156 into the circular chamber 160. Passage 162 extends through the lower part of the cup 154 tangentially into chamber 160. The conical deflector 164 supported on rod 166 is positioned within bowl 156 concentrically above port 158 a distance approximately the diameter of port 158. Conical deflector 164 allows the diameter of bowl 156 to be increased appreciably while maintaining the solid particles during contact in a gentle continuous circulation. Additionally, the tangential connection of passage 162 into chamber 160 causes the fluid flowing upwardly into the bowl to have a gentle rotational flow. This rotational flow further assures the even distribution of upflowing fluid in the bowl and the desired fluidizing of the solid particles.

The movement of solid particles to the next lower tray during a reverse flow pulse in cup 154 is improved as compared to tray 146. This improvement results from deflector 164 directing the downflow outwardly before it reaches the port 158 to sweep the solid particles within the bowl 156 through the port 158, the chamber 160 and passage 162 into the compartment below cup 154. Passage 162 discharges solid particles horizontally into the compartment above the next lower tray to provide a measure of assurance that the solid particles do not bypass a tray during the reverse flow pulse. When fluid upflow is discontinued, a column of contacting apparatus according to the design of cup 154 does not unload solid particles. The particles are supported on each cup in the chamber 160 and in the passage 162.

FIGS. 8A, 8B and 8C illustrate the action of the solid particles within the cup 154. In FIG. 8A, the particles are shown to be distributed substantially uniformly in a fluidized state within the bowl 156 at substantially the maximum rate of fluid upflow through the cup. FIG. 8B represents a reduced fluid upflow rate and shows the settling of a few solid particles into the port 158 and chamber 160 with the majority of the particles being in fluidized contact within bowl 156. The static condition of no fluid flow is shown in FIG. 8C to illustrate the manner by which the solid particles are retained on the tray by the cup 154 structure.

Figure 9A:
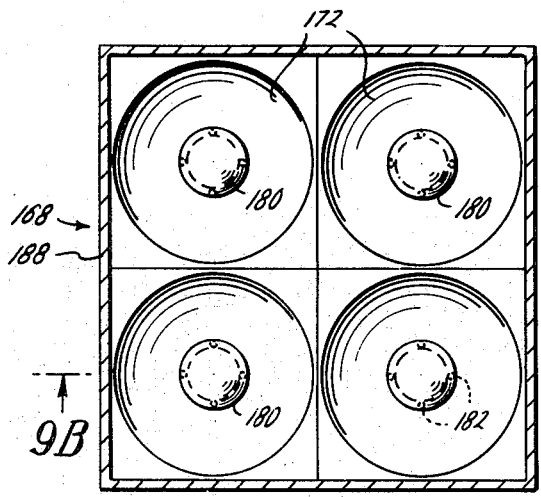
FIG. 9A is a plan view of the preferred contacting apparatus used for movement of the solid particles in their settling direction.
Figure 9B:
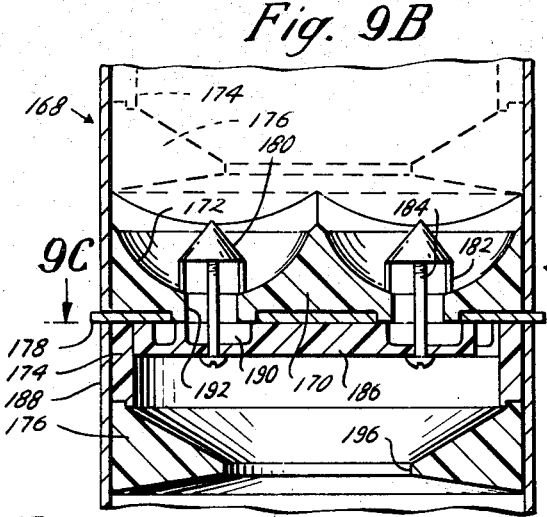
FIG. 9B is a sectional view of this apparatus taken along line 9B—9B in FIG. 9A.
Figure 9C:
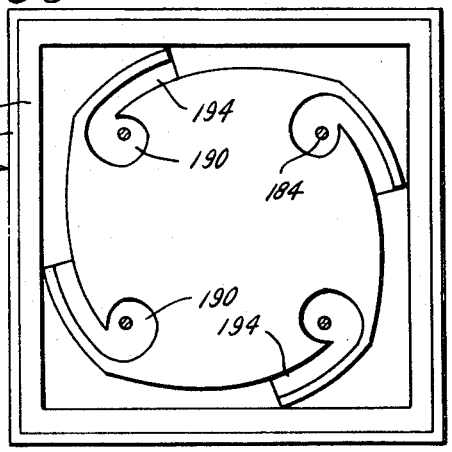
FIG. 9C is a sectional view of this apparatus taken along line 9C—9C in FIG. 9B to illustrate the configuration of the passages communicating between the contacting areas and the space below the apparatus.

The contacting apparatus illustrated in FIGS. 9A, 9B and 9C shows one form of contacting structure 168 in which four of the preferred forms of contacting cups such as is shown in FIGS. 7E, 7F, 8A, 8B and 8C are combined into a square tray unit. Combinations such as 4, 9, 16, 25, 48 or 100 such square units may be assembled to form a single contacting tray. Also, tray units may be comprised of seven hexagonally shaped cups.

The contacting structure 168 includes the bowl member 170 which defines the four contacting bowls 172, the ring 174, and the annular deflector 176. Bowl member 170 is supported on plate 178. A conical deflector 180 is supported above the central portion of each of the bowls 172 on legs 182 and is secured in such position by screw 184. Screw 184 also clamps the passage member 186 to the underside of plate 178. The box structure 188 surrounds the contacting structure 168 and is positioned between plates 178 of adjacent trays. The height of box structure 188 determines the spacing between the trays 168 in the column. Where multiple tray units are to be used the box structure would surround the complete tray structure. Ring 174 and deflector 176 are suitably secured to plate 178 by suitable means, such as, screws (not shown) extending therethrough and threaded into plate 178.

Passage member 186 defines a chamber 190 positioned under and in communication with the port 192 extending through bowl member 170 to the bottom of each bowl 172. Passages 194 are defined extending tangentially into each chamber 190 and opening to the underside of tray 168. As best shown in FIG. 9C, the passages 194 are each directed tangentially with respect to the interior of ring 174. Annular deflector 176 extends inwardly below ring 174 to define the central opening 196 with upper surface of deflector 176 sloping inwardly and downwardly toward said opening 196.

The operation of tray 168 is substantially the same as the operation of cup 154 previously described except for the addition of ring 174 and annular deflector 176 below each group of four cups. The primary function of ring 174 and deflector 176 is to provide a delay in the downward movement of the solid particles with each flow reversal pulse. Deflector 176, by delaying the downward movement of the solid particles, allows a larger volume of fluid to be pulsed to assure that all particles are moved to the next lower tray during each flow reversal pulse. The solid particles travel from the bowls 172 through the ports 192, the chambers 190 and are discharged through the passages 194 onto the interior of ring 174. During the flow reversal, most of the solid particles remain above the central opening 196 because of the centrifugal action created by the direction in which the passages 194 discharge the fluid and particles. WHen the pulse stops, the solid particles settle through the central opening 196 onto the next lower tray. The upper sloping surface of deflector 176 has a steep enough slope to assure that the solid particles settle through opening 196.

As mentioned, the tray unit may be used as a module for a column in which a plurality of such units may be combined into a square, rectangular or other shaped column. The components of tray 168 which are shown to be plastic in the drawings may be any suitable plastic such as polypropylene. In determining the material to be used for such components, consideration should be given to the temperatures and chemical properties of the fluids and solids which are to be contacted in the column so that the material of the components is inert and does not contaminate such fluids and solids.

The contacting structures shown in FIGS. 7A, 7C, 9A and 9C use square outside configurations in order that a plurality of such modules may conveniently be assembled laterally into a contacting structure of predetermined horizontal area. It is within the scope of this invention to employ other outside geometric forms, including but not limiting to hexagonal, circular and rectangular. Although the components shown in the drawings may readily be made of plastic as previously discussed, it is in the scope of this invention that the components may be constructed of any suitable material. This applies particularly for applications at elevated temperatures.

As may be seen, the contacting structures for the type A column are so designed to allow a fluidized contact between a fluid and solid particles with the fluid maintaining the solid particles in an expanded or fluidized state without carrying any appreciable number of solid particles between stages. Also, such structures allow the solid particles to be transported one stage at a time by a reverse pulse of the flowing fluid whereby substantially all of the solid particles are transported only one stage with each reverse pulse. The delay means provided with the tray structures functions to prevent the movement of the solid particles during transport onto the next lower tray for a limited period of time to assure that the solid particles do not bypass a tray structure during transport.

The preferred form of tray structure further provides a means of preventing the unloading of the column when no fluid is flowing and also provides a means of causing the fluid to have a rotational flow as it enters the contacting zone to assure uniform distribution of the fluid within the contacting zone.

The type A contacting structures are designed to be made in multiples to form a contacting tray and the contacting trays are readily assembled into a column in which the contacting and solid particle transport may be performed in accordance with the process of the present invention as herein described.

CONTACTING STRUCTURE FOR TYPE B COLUMN

Figure 10A:
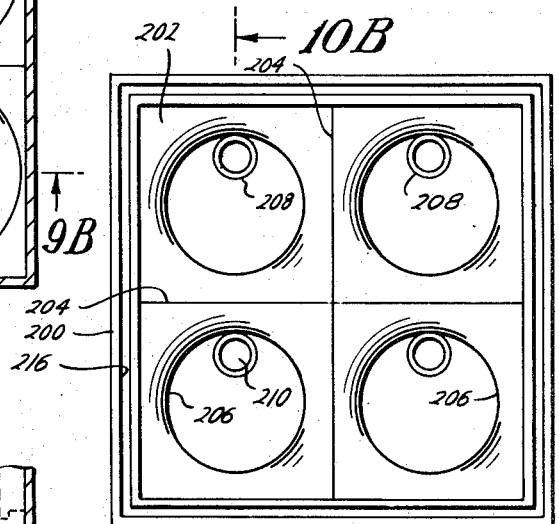
FIG. 10A is a plan view of the preferred form of contacting apparatus used for movement of the solid particles in a direction opposite to their settling direction.
Figure 10B:
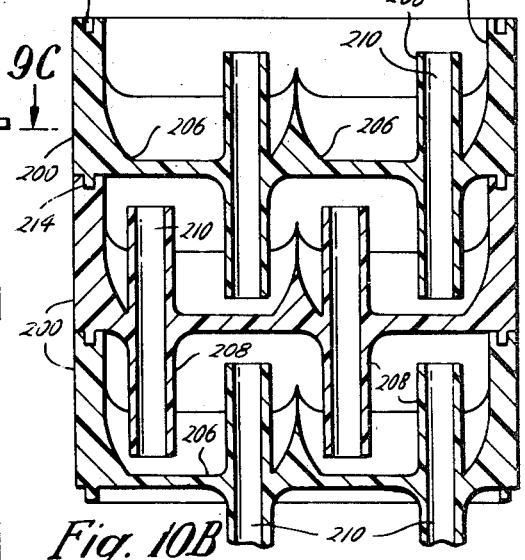
FIG. 10B is a sectional view of this apparatus taken along line 10B—10B in FIG. 10A.

FIGS. 10A and 10B shown the column 200 utilizing a plurality of cups 202 similar to cups 46 previously discussed, to illustrate how the cups 46 may be used as modules to form a column including a plurality of trays each of which includes a plurality of the cups 46. Each of the trays 200 shown in FIGS. 10A and 10B are identical except that the intermediate tray of the trays shown is rotated 180 degrees in a horizontal plane with respect to the other two trays shown. Each of the trays 200 is formed so that the ridges 204 divide its upper surface into four bowls 206. The tubes 208 which define the passage 210 may be formed integrally with the tray 200. Tubes 208 extend upwardly to a level slightly below the upper edge of walls 212 which extend upwardly around the outer edge of the tray and extend downwardly to terminate immediately above the next lower bowl 206. The tubes 208 are offset to one side of the bowl 206 so that each bowl has a tube 208 extending upwardly therein at one side and another tube 208 extending downwardly therein from the next higher tray at the opposite side of the bowl.

When several of the trays 200 are assembled into a column, the rib 214 on the lower side of each tray fits into the groove 216 formed in the upper edge of the walls 212. The trays 200 are also formed so that when assembled two adjacent trays cooperate to eliminate sharp corners at the intersection of walls 212 with the underside of the next higher tray and also around the tubes 208 at the point of intersection with the underside of the tray through which they extend. The purpose of this rounding of corners at the top of the compartment above each tray is to effect the purging of air or gas completely through and out of the system by the downflowing fluid movement, with air otherwise tends to remain trapped in the upper portion of the compartment. The presence of trapped air or gas in the column interferes with the proper movement of solids in this liquid system, since the air, because of its compressibility, results in a dampening of the flow reversal pulse.

The operation of the column shown in FIGS. 10A and 10B is substantially the same as the operation of the column 44 shown in FIGS. 4A and 4B. The net fluid flow through the column of trays 200 is downwardly while the solid particles are periodically moved upwardly in the column by a reverse flow pulse. The solid particles are continuously contacted by fluid throughout the type B column. The solid particles are fluidized within the bowls 206 below the level of the top of tubes 208 by the flow of fluid downwardly out of passages 210 with the fluid continuing upwardly in bowls 206 and into the passages 210 at the top of the tubes 208. The solid particles settle in the bowls 206 prior to the occurrence of the reverse flow which causes the solid particles to be carried from the bowls 206 upwardly through the passages 210 to be discharged from the top of tubes 208 and settle into the bowls 206 of the next higher tray 200 before the downward flow of the fluid is restarted. The amount of fluid moved during the reverse flow is preferably sufficient only to move the volume of solid particles that have settled in each of the bowls 206 to the next higher tray 200. Allowing the solid particles to settle prior to the occurrence of the reverse flow minimizes the amount of fluid moved during the reverse flow and avoids carrying of solid particles past the next higher tray.

The contacting structures of the present invention for the type B column are suitable to be made into trays and a plurality of trays connected to form a column. These structures provide intimate contact between the fluid and the solid particles on each tray and allow the solid particles to be transported through the column one tray at a time responsive to a reverse flow pulse of the fluid and such transport is in a direction opposite to the normal settling direction of the solid particles in the fluid. For example, solid particles which normally settle downwardly are transported upwardly through the type B column one tray or stage at a time with each reverse fluid pulse.

The fluid-solid contact on the type B tray structures provides an intimate contact with the solid particles being fluidized by the fluid flow while the possibility of carrying solid particles back to the next stage with the fluid is minimized.

CHEMICAL SEPARATIONS — URANIUM RECOVERY

The application of the process of the present invention as it could be applied to a hydrometallurgical process for the recovery of uranium is illustrated in FIGS. 11A, 11B and 11C and is an example of the chemical separation. After the uranium ore is ground, the uranium ions put into solution by means of an acid or other suitable treatment, and the large particles removed, the resulting slurry is fed to the type A exhaustion column 220 through inlet 222 at the bottom of contacting section 221. As shown in FIG. 11C, the slurry passes upwardly through the contacting section where it is stripped of uranium ions by ion exchange resins to leave the column through outlet 224 as a spent slurry. The ion exchange resins enter contacting section 221 near the top thereof, and are moved downwardly by control means 223 in countercurrent contact with the upflowing slurry to remove the uranium ions from the slurry. After the resins pass through section 221, they collect in reservoir 225. The resins are removed from reservoir 225 by resin control means 229 which controls the movement of the resins down through washing section 227. In section 227 the resins are in countercurrent contact with pure water injected into the bottom of this section by metering pump 226 to wash the slurry from the resins. The slurry-laden wash water continues up through reservoir 225 to mix with the enriched slurry in section 221. The cross-sectional area of wash section 227 can be a fraction of the cross-sectional area of contact section 221 because the resin particles can be transferred through section 227 very rapidly. The small area of section 227 minimizes wash water required and the resultant dilution of incoming slurry. Reservoir 231 collects the resins which have passed through section 227. The resins are removed from reservoir 231 by resin transfer means 230 and are delivered to the type B column 228. Resin transfer means 230 causes the resins to move upwardly through column 228, passing first through regeneration section 233, where they are in countercurrent contact with the regeneration solution injected into the column by metering pump 232. The uranium-rich regeneration or stripping solution is removed from the column be metering pump 236 and delivered to vessel 231 which represents facilities for removing the uranium from the regeneration solution and refining the solution for reuse. As the resins continue upwardly through column 228 they pass through washing section 235 where they are in countercurrent contact with pure water injected into the column by metering pump 238 at the top of the column. The pure wash water washes the resins free of the regeneration solution which is thereby recovered and removed from the column by metering pump 236. The resins are delivered from the top of column 228 into column 220 accompanied by a small amount of the pure wash water.

Thus, the present invention may be used to provide intimate countercurrent contact between a uranium slurry and solid resin particles which particles function in ion exchange to carry the uranium ions out of the uranium slurry. The solid resin particles may then be regenerated to recover the uranium and to prepare the solid resin particles for reintroduction into the exhaustion column.

RESUME

From the foregoing it may be seen that the present invention provides an improved process for intimate countercurrent contact between solid particles and a fluid such as water or a slurry containing uranium ions in solution. The process provides for the circulation of the solid particles in a closed loop with the solid particles being transported one stage at a time by a reversal of the flow in the vessel concerned. The process and apparatus therefor provides a maximum of fluidized movement of the solid particles to assure that all solid particles are available for contact with the fluid in each stage without causing a transport of the solid particles between stages except when desired. Further, the transport of the solid particles through their closed loop is such that in one portion thereof they are moved in a direction opposite to their normal settling direction.

Both type A and type B columns of the present invention provide a plurality of stages of contact. In each stage the solid particles and fluid are controlled to minimize channeling and to assure that relatively the same amount of solid particles are maintained in each stage. With this control of the solid particles and the fluid flow, a type A column of the present invention may have thirty to forty stages in a column height of sixteen feet. This allows the use of short vertical columns which because of the particular tray structures of the present invention are not limited in a lateral direction even with large fluid flow volumes.

Even through many of the solid particles used in fluid-solid contacting processes are fragile, the present invention provides structure for transporting the solid particles in the columns and for transferring the solid particles between columns which minimizes the problems due to solid particle attrition. The resilient valving members in the particle transfer means not only protect against particle damage but assure a seal against a valve seat even though solid articles may be trapped therebetween. The particle transfer means may further be utilized to control the volume of fluid transferred with the solid particles.

The specific tray structures of the present invention are designed to distribute the fluid flow uniformly through the solid particles and to assure that few, if any, of the solid particles remain on the tray unexposed to the fluid flow. Further, certain of these tray structures are also designed to prevent unloading of the column when fluid flow therethrough is shut off.

The present invention thus provides a countercurrent, multiple stage, fluid-solid contacting process having a greatly improved contacting efficiency and eliminating the need for outside devices to transport the solid particles in a direction opposite to their normal settling direction in the fluid.

Thus, this invention provides method and apparatus especially suited to performing chemical separations either by contacting ion exchange resin particles with an ionized fluid, or by contacting molecular sieve particles with a mixture of several liquids not necessarily ionized.

The foregoing disclosure and description of the invention is illustrative and explanatory thereof, and various changes in the method, as well as in the details of the illustrated construction, may be made within the scope of the appended claims without departing from the spirit of the invention.

What is claimed is:

1. The method of providing intimate countercurrent contact between the fluid and solid particles in a contacting zone which includes a plurality of stages defined by a plurality of trays having passages therethrough including the steps of, directing fluid through said contacting zone, said fluid passing through said passages in said trays to fluidize the solid particles in each of said stages, and intermittently reversing fluid flow through said contacting zone to transport solid particles in each stage through said passages in said trays to the next subsequent stage.

2. The method according to claim 1 wherein the fluid is a liquid and including the step of,
controlling the reversing of liquid flow so that substantially all of the solid particles are transported a single stage with each flow reversal.

3. The method according to claim 1 including the step of,
directing the fluid flow through each stage to fluidize the solid particles with such fluid flow whereby intimate contact between the fluid and the solid particles is provided in each stage.

4. The method according to claim 1 wherein
said particles tend to settle downwardly in said fluid, the fluid flow during contacting is downwardly between stages and upwardly within each stage, and the solid particles are elevated in the column one stage with each fluid flow reversal whereby intimate countercurrent contacting is provided between the fluid and solid particles.

5. The method according to claim 1 including the step of
delaying the movement of the solid particles after they have cleared their stages to prevent bypassing of a stage by said particles.

6. The method according to claim 5 wherein said delaying step includes,
directing the reverse fluid flow leaving each stage in a direction at an angle to the direct line of flow between stages.

7. The method according to claim 1 including the step of,
imparting a rotary component of flow to the fluid as it enters each stage whereby the fluid is distributed uniformly through the solid particles in each stage.

8. The method according to claim 1 wherein
the contacting fluid flow in said contacting zone is maintained at a rate sufficient to fluidize said solid particles in each stage without transporting particles between contacting stages.

9. The method of providing intimate countercurrent contact between a fluid and solid particles in a contacting zone according to claim 1 wherein
said reverse fluid flow step transports said solid particles through said vessel in a direction opposite to their settling direction in said fluid.

10. An apparatus for providing intimate contact between fluids and solid particles, comprising
an upright vessel,
a plurality of substantially imperforate contacting tray structures mounted in vertically spaced relationship to each other within said vessel,
a fluid inlet into said vessel,
a fluid outlet from said vessel,
a solid particle inlet into said vessel,
a solid particle outlet from said vessel,
a means defining a plurality of passages through each of said tray structures,
a plurality of tubular members defining passages extending through each of said tray structures through which fluid flow is to flow for fluidized fluid-solid contacting on said trays and with reverse flow through said passages for solid transport,
each of said tubular members extending substantially above and below said tray structure,
the upper end of said tubular members terminating below the next higher tray structure,
the lower end of each of said tubular members terminating above the next lower tray structure, and
means for reversing the direction of fluid flow in said vessel to transport solid particles on each tray structure to the next subsequent tray structure whereby the solid particles move through said vessel in a direction opposite to the direction of flow of fluid through said vessel from said fluid inlet to said fluid outlet.

11. An apparatus according to claim 10 wherein said tray structures include
means for assuring that substantially all of the solid particles are discharged from the tray structure during reverse fluid flow before solid particles from the preceding tray structure are received on the tray structure.

12. A fluid-solid contacting apparatus comprising,
a plurality of substantially imperforate trays positioned in vertically stacked relationship, and
at least one tubular member defining passages extending through each of said trays through which fluid is to flow for fluidized fluid-solid contacting on said trays and with reverse flow through said passages for solid transport,
each of said tubular members extending substantially above and below said tray structure,
the upper end of each of said tubular members terminating below the next higher tray,
the lower end of each of said tubular members terminating above the next lower tray.

13. A fluid-solid contacting apparatus according to claim 12, wherein the upper end of each of said tubular members terminates above the lower end of each of said tubular members from the next higher tray.

14. The method of providing intimate countercurrent contact between fluid and solid particles in a contacting zone which includes a plurality of stages defined by a plurality of trays having passages therethrough including the steps of,
flowing fluid through said plurality of contacting stages within said contacting zone,
said fluid flow passing through said passages to fluidize said solid particles in each of said stages,
imparting a rotary component of flow to the fluid flowing through said passages in each contacting stage as it comes into contact with the solid particles to more evenly distribute the upward fluid flow and there to agitate the solid particles to a fluidized state whereby improved intimate contact between the solid particles and the fluid is provided in each contacting stage, and
intermittently reversing fluid flow through said contacting zone to transport solid particles in each stage through said passages in the tray to the next subsequent stage,
said reverse fluid flow flowing through said passages in a direction opposite to said contacting flow.

15. A fluid-solid contacting apparatus comprising,
a plurality of trays positioned in vertically stacked relationship,
each of said trays defining at least one bowl, and
means defining flow passage through each of said bowls,
the upper end of said flow passage terminating a substantial distance above the bowl through which it extends,
the lower end of said flow passage terminating above the next lower bowl but substantially below the upper end of the flow passage through said next lower bowl,
flow through said flow passage in an upwardly direction causing solid particles above said bowl to flow upwardly through the next higher flow passage through each of said trays,
flow downwardly through each of said flow passages causing solids above each of said bowls to be fluidized and provide intimate contact between said solids and the fluid flowing therethrough.

16. An apparatus for providing intimate countercurrent contact between a fluid and solid particles, comprising
means defining a contacting zone having a plurality of substantially imperforate contacting trays each defining a contacting stage,
means for directing fluid through said contacting zone,
said fluid directing means including a plurality of passages in each of said trays,
fluid flow in a forward direction through said passages fluidizing the solid particles in each of said contacting stages, and
means for intermittently reversing the fluid flow through said contacting zone and said passages,
each of said passages being arranged in size with respect to the particles to transport solid particles in each stage to the next subsequent stage responsive to said fluid flow.

* * * * *